(12) United States Patent
Hergenroeder

(10) Patent No.: US 11,393,352 B2
(45) Date of Patent: Jul. 19, 2022

(54) READING AND CONTINGENT RESPONSE EDUCATIONAL AND ENTERTAINMENT METHOD AND APPARATUS

(71) Applicant: HELLO CLOVER, LLC, Houston, TX (US)

(72) Inventor: Alex Lauren Hergenroeder, Middleburg, VA (US)

(73) Assignee: HELLO CLOVER, LLC, Houston, TX (US)

( * ) Notice: Subject to any disclaimer, the term of this patent is extended or adjusted under 35 U.S.C. 154(b) by 562 days.

(21) Appl. No.: 15/703,715

(22) Filed: Sep. 13, 2017

(65) Prior Publication Data
US 2018/0277002 A1 Sep. 27, 2018

Related U.S. Application Data
(60) Provisional application No. 62/475,720, filed on Mar. 23, 2017.

(51) Int. Cl.
*G09B 5/06* (2006.01)
*B25J 11/00* (2006.01)
(Continued)

(52) U.S. Cl.
CPC .............. *G09B 5/06* (2013.01); *B25J 9/0003* (2013.01); *B25J 11/001* (2013.01); *B25J 11/005* (2013.01);
(Continued)

(58) Field of Classification Search
CPC ... G10L 15/22; G10L 25/63; G10L 2015/223; G06F 3/017; G06F 3/167; G06F 3/01;
(Continued)

(56) References Cited

U.S. PATENT DOCUMENTS

| 5,438,631 A | * | 8/1995 | Dai ...................... G06V 30/347 382/197 |
| 5,730,602 A | * | 3/1998 | Gierhart ................ G09B 11/00 434/362 |

(Continued)

FOREIGN PATENT DOCUMENTS

WO   WO 2014/059416 A1   4/2014

OTHER PUBLICATIONS

Katie, "Speech Development: Phonological Processes and Phonological Delay", Articulation & Phonology (AKA Speech Sounds), Speech & Language 101, Sep. 27, 2011, Swank Wordpress Theme by PDCD, http://www.playingwithwords365.com/phonological-processes-and-phonological-delay/ (25 pages).

(Continued)

*Primary Examiner* — Jack Yip
(74) *Attorney, Agent, or Firm* — Orrick Herrington & Sutcliffe LLP; Richard F. Martinelli; Weimin Ning

(57) ABSTRACT

The present invention describes devices and methods for assisting in the education of individuals, particularly the education of children. The present invention brings provides technological interventions with information about the child's eye-gaze location, gesture activity, emotional expression or other inputs. The disclosure further seeks to enhance learning by mimicking, for example, the parent's output of activities of physical gesture and of directed eye gaze or joint attention to enhance the child's learning experience. The present invention includes responds to input, either from the user, other indivduals, or information stored in memory. The present invention then processes, via a processor and associated memory, the inputs according to one or more computer program modules. Based on the input and computer program module(s), the present invention then processes an output, of various forms, to the user.

38 Claims, 7 Drawing Sheets

(51) Int. Cl.
*B25J 9/00* (2006.01)
*B25J 13/00* (2006.01)
*G06F 3/01* (2006.01)
*G06F 3/16* (2006.01)
*G09B 11/00* (2006.01)

(52) U.S. Cl.
CPC ............ *B25J 13/003* (2013.01); *G06F 3/017* (2013.01); *G06F 3/167* (2013.01); *G09B 11/00* (2013.01)

(58) Field of Classification Search
CPC . G06F 3/013; G09B 11/00; G09B 5/06; B25J 9/0003; B25J 11/001; B25J 11/005; B25J 13/003
See application file for complete search history.

(56) References Cited

U.S. PATENT DOCUMENTS

| | | | |
|---|---|---|---|
| 9,323,352 B1 | 4/2016 | Haskin et al. | |
| 2006/0209175 A1* | 9/2006 | Cohen | G06V 10/235 348/14.01 |
| 2006/0267964 A1* | 11/2006 | Cohen | G06F 3/03545 345/179 |
| 2007/0055523 A1* | 3/2007 | Yang | G09B 19/06 704/257 |
| 2007/0192910 A1* | 8/2007 | Vu | B25J 5/007 700/245 |
| 2009/0208913 A1 | 8/2009 | Xu et al. | |
| 2010/0233662 A1 | 9/2010 | Casper | |
| 2011/0161076 A1* | 6/2011 | Davis | H04M 1/72448 704/E15.001 |
| 2012/0295510 A1 | 11/2012 | Boeckle | |
| 2013/0346060 A1* | 12/2013 | Shin | G06F 3/013 704/2 |
| 2014/0337740 A1* | 11/2014 | Kwon | G06F 3/013 715/728 |
| 2014/0356822 A1* | 12/2014 | Hoque | G09B 19/04 434/185 |
| 2015/0099946 A1* | 4/2015 | Sahin | G16H 50/20 600/301 |
| 2015/0314454 A1* | 11/2015 | Breazeal | B25J 11/001 700/259 |
| 2016/0187976 A1* | 6/2016 | Levesque | G06F 3/013 345/156 |
| 2016/0203832 A1 | 7/2016 | Paul et al. | |
| 2018/0075659 A1* | 3/2018 | Browy | G06F 3/011 |
| 2018/0095539 A1* | 4/2018 | Zhang | G06F 3/013 |
| 2018/0253897 A1* | 9/2018 | Satake | H04L 67/38 |
| 2018/0314689 A1* | 11/2018 | Wang | G06F 40/58 |

OTHER PUBLICATIONS

Katie, "Articulation Development: What's Normal? (& What Isn't)", Articulation & Phonology (AKA Speech Sounds), Speech & Language 101, Sep. 25, 2011, Swank Wordpress Theme by PDCD, http://www.playingwithwords365.com/speech-articulation-development-whats-normal-what-isnt/ (31 pages).

Hill, "How Target Figured Out a Teen Girl Was Pregnant Before Her Father," https://www.forbes.com/sites/kashmirhill/2012/02/16/how-target-figured-out-a-teen-girl-was-pregnant-before-her-father-did#5adf65836668, retrieved from the internet Apr. 28, 2019 (five (5) pages).

International Search Report (PCT/ISA/210) issued in PCT Application No. PCT/US2019/022881 dated May 23, 2019 (two (2) pages).

Written Opinion (PCT/ISA/237) issued in PCT Application No. PCT/US2019/022881 dated May 23, 2019 (eight (8) pages).

* cited by examiner

READING AND CONTINGENT RESPONSE EDUCATIONAL AND ENTERTAINMENT METHOD AND APPARATUS

CROSS REFERENCE TO RELATED APPLICATIONS

This application claims the benefit of U.S. Provisional Application No. 62/475,720 filed Mar. 23, 2017, the contents of which are incorporated herein by reference.

BACKGROUND

This invention relates to a method and apparatus for assisting in the education of individuals, particularly the education of children. As directed to children, the present invention provides children with the sort of engaged, one-on-one responsiveness that is typically only available from an engaged, responsive adult.

The present invention brings provides technological interventions with information about the child's eye-gaze location, gesture activity, emotional expression or other inputs. The disclosure further seeks to enhance learning by mimicking, for example, the parent's output of activities of physical gesture and of directed eye gaze or joint attention to enhance the child's learning experience.

The present invention includes responses to inputs, either from a user, other individuals, or, for example, information stored in memory. The present invention then processes, via a processor and associated memory, the inputs according to one or more computer program modules. Based on the input and computer program module(s), the present invention then presents an output, of various forms, to the user.

Inputs may take on various forms, such as gestures, eye gaze, facial expressions, physical movements, emotional expressions, vocalizations, or other sensory inputs. The method and/or apparatus then interacts with one or more program modules to create outputs such as physical gestures, such as pointing, directed eye gaze, or other sensory outputs in a manner that assists the individual in a learning environment. Depending on the form of architecture, the appropriate input and output devices may also contain, as an example, cameras, microphones, speakers, and various devices to provide physical movement, such as an electro-mechanical pointing device, or pneumatically controlled movement device. By so doing the present invention reacts with companionship and, in certain cases, physicality to aid in an individual's education. This invention relates to having a contingent response that mimics traditional methods by which an individual may learn, and that may include a physical interaction with the child.

The present invention is also beneficial to parents and to researchers because it is easy to update the device with a module or modules that contain best practices and interventions from the latest academic research. In this way, the device is able to quickly and consistently disseminate best practices discovered by early childhood education researchers to all children with access to the device. This is a tremendous advantage over the current system of gradually disseminating information about best practices through a variety of networks over the course of many years and in some cases over the course of many decades.

Because it can be very difficult to educate every parent about the latest in early childhood education research, parents and even preschool teachers may not be aware of the best practices discovered by academic researchers until many years have passed. In the intervening time children will have failed to reap the benefit of the academic research because it had not yet become widely known to all parents.

Furthermore, even when best practices from academic research reach parents the best practices may be confusing to implement or may involve changing the daily habits of parents or preschool teachers. As a result of the difficulty of changing habits and the difficulty of reaching parents with news of new research, many helpful best practices do not make their way to the parents or children who need them, or are not implemented consistently because consistent implementation, while beneficial, involves the difficult process of changing human behaviors.

The present invention helps resolve these issues. When a new discovery is made in educational academic research, the behavior of the device can be immediately updated through a simple software or module update and immediately, consistently, and precisely follow the best practice generated in a lab but in households and day-cares across the country. A benefit of the device is its ability to consistently, precisely, conveniently, and immediately follow the best practices of academic researchers through simple software or module updates. The benefit provided by this device of being able to implement interventions at scale with consistency and immediacy is tremendously advantageous to researchers, children, and parents.

Prior to the present invention, it could take years or even decades for best practices discovered by academics to reach parents and children. This long path to broad implementation typically involved lengthy and sustained public relations efforts and the lengthy process of people changing habits over time. With this device, best practices from researchers can be precisely implemented on a large scale with immediate effect, via easy updates to the processing modules.

For example, the research of Harvard Professor Meredith Rowe indicates that it is extremely important for parents to use gesture when interacting with babies and infants. Specifically, Professor Rowe of Harvard found that when parents gesture more, children gesture more and children who gesture more have higher vocabularies independent of I Q. Rowe, M. L., S Ozcaliskan, and S. Goldin-Meadow, 2008, "Learning Words by Hand: Gestures Role in Predicting Vocabulary Development," First Language (2): 182-199. As the research found, higher vocabulary in early childhood is the best predictor of later academic and life success and this simple intervention of gesturing more increases vocabulary regardless of the child's IQ. Thus, the present invention is capable of gesturing and labeling in such a way that should increase children's use of gesture and thereby increase their vocabularies and likelihood of academic success High quality talk means different things at different stages of early childhood. Specifically, high quality talk for infants and babies means talk with gestures and lots of different physical objects. High quality talk with toddlers means introducing and responsively explaining sophisticated and unusual vocabulary words. High quality talk for toddlers and preschool-aged children means engaging in decontextualized talk or talk about the past or future. It is difficult for any parent to understand and implement in their day to day routines with their children, but through the present invention a high quantity of high quality of talk specific to the child's developmental stage is easy to incorporate into a family's daily routine. For instance, when the child is an infant or baby, the present invention uses its capability to gesture in combination with its eye-gaze tracking, facial expression tracking, and gesture tracking, and object recognition to consistently incorporate gesture and labeling into the baby or infants day to day play. As the child becomes a toddler, the present invention is aware of the unusual and sophisticated vocabulary that is most helpful for the child to learn and is able to remember to introduce unusual and sophisticated vocabulary as part of the child's daily play, including through reading books that are known to the present invention to contain unusual or sophisticated vocabulary. Later, as the child becomes a preschooler the present invention, using a three-dimensional physical presence can join the family at the dinner table or the breakfast table and engage in conversation with the child about past or future events. Parents and other family members can join in the conversation. In this way the present invention is engaging the family in best practices from researchers in a seamless and convenient fashion. Overall, the present invention's gesture and responsiveness make it an ideal tool for researchers and parents to work together to help children learn effectively in early childhood Other objects and advantages of the invention will be apparent from the following detailed description of non-limiting examples of the invention.

DETAILED DESCRIPTION OF THE EMBODIMENTS OF THE INVENTION

Figure 1:
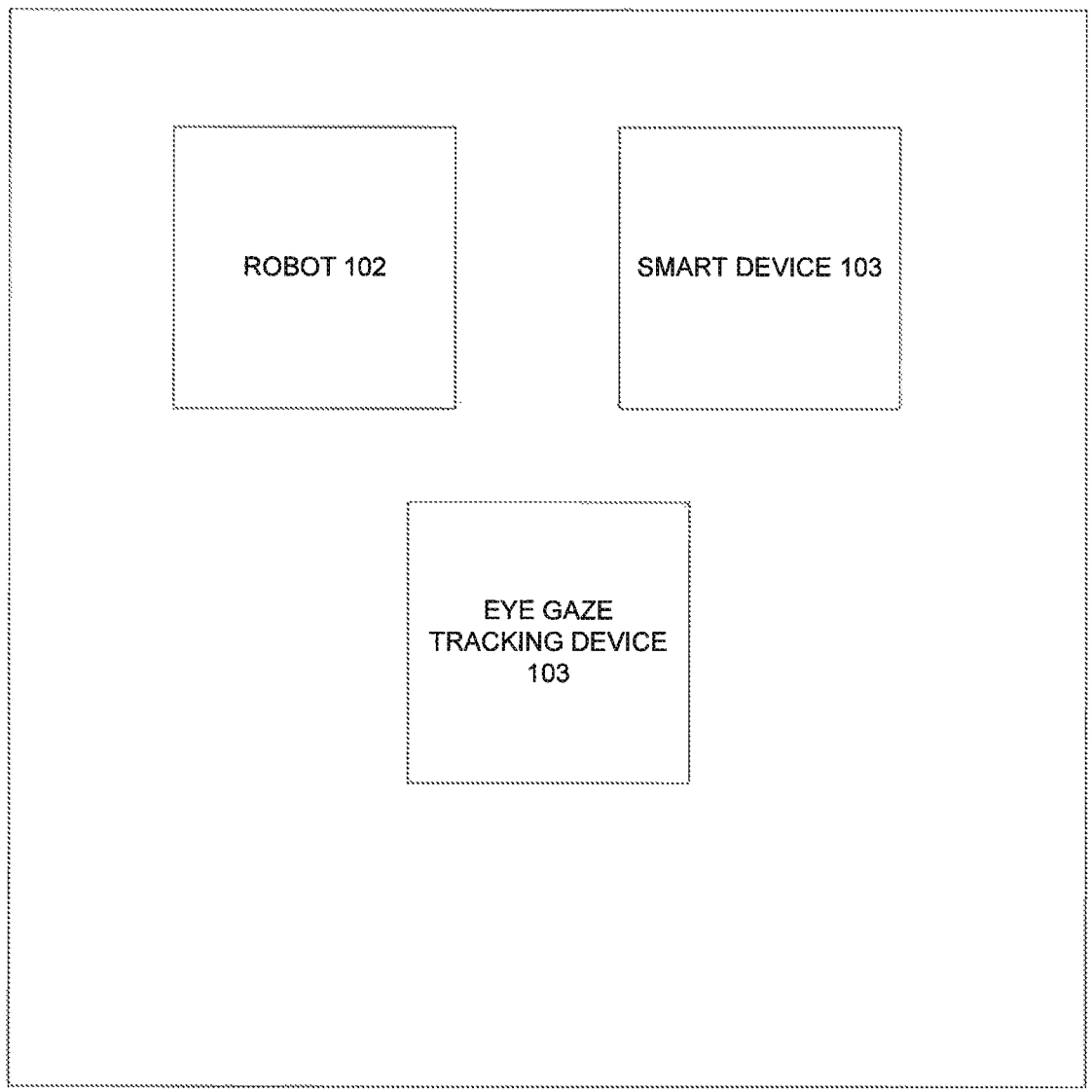
FIG. 1 is a representation of an embodiment of a physical configuration of the present device.

This disclosure describes a method and/or apparatus to provide assistance to an individual who is learning. While throughout this description reference will be made to a child as the individual who is undertaking the learning experience, the invention is not limited to education of children and can be used to enhance the learning of any individual.

The a method and/or apparatus of the present invention interacts with and teaches children in the same manner as they are taught by humans, but with the benefits provided by a system using one or more program modules. The device receives input from a child in various forms, including physical movements, facial expressions, verbal or other aural expressions. The architecture and techniques of the present invention responds to the child's inputs with, after processing, various outputs appropriate and responsive to the learning environment, including physical gestures, and audio or video responses. In this way the method and/or apparatus of the present invention are able to mimic the typical adult-child learning interaction.

Because very young children have limited language abilities, adults tend to get their information about what is interesting to the child in four forms: where the child is looking; where the child is gesturing (what the child is pointing at, what the child is putting in his or her mouth, what the child is grabbing, any attempts at sign language, etc.); the child's facial expression and/or posture; the child's vocal output (although this may not be in the form of words but may be grunting, crying, giggling, babbling, or, indeed, speech of varying degrees of proficiency) and the sound of the output (variation in pitch, tone, speed, etc.).

Similarly, due to the child's lack of ability to understand language consistently, the adults in the child's life will often supplement vocalized statements with gestures and/or the use of directed eye gaze in order to convey meaning to the child. Physical gestures oftentimes improve a learning environment, with the child learning more than just receiving a passive, non-physical response from a learning device. Directed eye gaze takes many forms but there are two particularly helpful examples. In one example, the adult looks where he or she wants the child to look in order to draw the child's attention to a particular area of focus. In another example, the adult looks at the child and then looks where he or she wants the child to look. In both examples the directed eye gaze helps the child understand what is important in his or her environment at that moment in time.

The present invention brings technological interventions in early childhood education closer to this responsive parent-child interaction by providing technological interventions with information received from the child, including eye-gaze location, gesture activity, vocalization, and emotional expression. The disclosure further seeks to enhance learning by mimicking the parent's activities of physical gesture and of directed eye gaze or joint attention to enhance the child's learning experience. In addition, the present invention may use "motherese" to enhance the learning environment. "Motherese" is high-pitched, cooing speech that may include the repetition and hyperarticulation.

The present invention utilizes any type of exterior device that can be used to assist in learning. For example, an apparatus of the present invention may comprise of a tablet computer, a desktop computer, or a mobile computer device. In turn, the computer can be incorporated into devices familiar to a child, such as a stuffed toy or robot. In addition, the present invention can take on a form that is easily configurable, such as a device that can attach to a child's playpen, or the back of a car seat. When configured in this manner, the present invention can be used in any location, to provide an educational environment for the child in a manner that is transportable, portable, and that can readily be transferred or carried to any location.

The present invention can also take on a component form, wherein the various input, one or more program modules, and output may be in one or more separate devices. For example, the program module, video, and audio components may exist on a portable computing device such as an iPad, while a separate component connected to the iPad may include an eye gaze tracker device and a physical gesture device (such as a movable arm).

There are various areas in which the present invention can be used within a learning environment. The following examples describe two such areas; however, these examples are not meant to be limited or otherwise define in isolation the scope of the claimed subject matter, and are used for showing different embodiments without limitation.

In one embodiment, the present invention leads an interactive lesson with the child, such as reading a book. When reading a book to a child, an engaged parent usually does not simply read the text of the picture book, but instead reads the text, then notices which parts of the pictures on the page are drawing the interest of the child and then provides a contingent response or comment about those areas of interest. A parent reading a page in a book about ducks would read the text and then note that the child is looking at a specific duck. The parent would then point to the duck picture (and perhaps look at the child and then at the duck picture) and say "Do you see the duck? This is the duck. The duck is splashing". As the child becomes older and more advanced the parent may point to the picture of the duck and look at the picture of the duck and then look at the child and say "What is this?" The child would then respond that this is the duck. The parent might then point to what the duck is doing and say "What is the duck doing?" and the child would respond that the duck is splashing. In both instances pointing and directed eye gaze are helpful, even invaluable, tools to enable the parent and child communicate effectively. The critical point is that reading a picture book to a young child is not simply reading text but actively noticing the pictures that draw the interest of the child and through gesture (pointing, etc.) and informational commentary or back and forth questioning educating the child about the pictures in a responsive, engaging manner. The parent is responsive in the moment of interaction with the child, and that responsiveness leads to better learning outcomes.

The present invention would operate in a manner to provide the responsiveness from an adult in an educational environment to enhance the learning process.

For example, the present invention would read to the child by transmitting to the child both an audio output of the words of the book, as well as utilizing a physical pointing device to point to certain pictures in the book to highlight vocabulary words, or, as a child grows older, ask the child critical thinking questions. While the present invention would follow a lesson plan in much the same way a teacher would follow a lesson plan, the present invention remains responsive to the child throughout the lesson. For example, the present invention would constantly scan the facial expression, body movements, eye gaze, vocalizations, and gestures of the child. If the present invention notices that the child is becoming fidgety or looking away, the present invention might ask the child a question or point out something of interest to the child in order to reengage the child in learning the material. Alternatively, the present invention might notice that the child is pointing at a duck on a page, or gazing intently at a particular duck on the page. Noticing this, the present invention would pause reading to point to the duck as well and say, for example, "It's a duck" several times to help the child understand that the item he is gazing and pointing at is something called a "duck." Again, the present invention is utilizing its eye gaze, three-dimensional pointing/gesture, and responsiveness abilities to keep the child engaged and to help the child learn in the same way that a caring teacher or parent would help the child learn and keep the child engaged.

In another embodiment, the child would engage the present invention in purely child-lead play. In this scenario the child plays as he or she desires and the present invention is responsive to the child in the same manner as a parent or other adult caregiver. For example, a child named James might decide that he would like to practice reading to the apparatus. The present invention would work with James—for example, as a stuffed toy located near James. The present invention will listen to James read and when James comes to a difficult word, the present invention would register that James is struggling with the word via inputs from James' vocalizations, gestures, eye-gaze, and facial expressions, and the present invention would provide assistance by pronouncing the word for James.

Alternatively, a baby, Julia, might decide that right now she wants to play with her small zoo toys and present invention (in whatever form it takes). In this case Julia might hold her toy tiger and wave it around in front of the present invention. The present invention would then respond by looking and pointing at the toy tiger and saying "It's the tiger". Julia might repeat this several times with several different animals. In each case, Julia is gaining exposure to new vocabulary words in the same way that she would if she were playing with her parents, namely, the apparatus is responding to Julia's gestures with directed eye gaze, gesture, and an encouraging verbal response. In another scenario, Julia might decide that she is going to giggle and dance. The present invention would narrate Julia's activities in an encouraging fashion by saying "Look at you Julia! Are you dancing and giggling? Yes, you are!" looking at Julia. Again, the present invention is exposing Julia to relevant vocabulary in a responsive, relevant, encouraging fashion.

It is beneficial to provide the child with the type of responsive interactions and child-lead interactions that are valuable in parent-child interactions. It is also beneficial to provide non-verbal cues to help children understand what is being said and what object is being discussed. Specifically, it is beneficial for an educational device to be able to gesture and especially to be able to "point" to an object the way a parent would point to an object to understand which object or picture is being discussed. It is also beneficial for an educational device to be able to use eye-gaze both to draw the attention of the child by looking at the child and then to draw the child's attention to a specific object to help the child who is still a language learner to understand that the object being discussed is the object at which the parent has directed his or her gaze.

While some children will simply gaze at an object of interest to elicit a response from a caregiver, other children will gesture or point to the object of interest. Still other children will gesture while looking back and forth from the parent to the object of interest and vocalizing. Each child is different and children may even use different techniques at different times depending on the adult with whom they are interacting or the child's level of interest in the object. Typically, drawing the attention of the adult involves some combination of gesturing, eye-gaze, and vocalization.

Referring back to the aforementioned example of a parent reading to the child: when reading a book to a child an engaged parent does not simply read the text of the picture book but instead reads the text, then notices which parts of the pictures on the page are drawing the interest of the child, and then provides a contingent response or comment about those areas of interest. The parent may identify this area of interest simply by noticing which parts of the page the child is looking at, however, they may also notice that the child is pointing to specific areas of the picture on the page. When a child points he or she is said to be gesturing or engaging in gesture. This is another way that children let parents know what has drawn their interest. A responsive parent will both encourage this behavior and be sure to provide the information the child is seeking, preferably in motherese if the child is very young.

This active noticing of the child's area of interest also occurs outside of the context of reading to children. Specifically, when playing or interacting with a child an engaged, responsive parent will notice the objects that draw the interest of the child and provide a contingent response educating the child about the objects. This typically occurs in one of several ways: either the child gazes or looks at an object and the parent notices this gaze; or the child gestures to an object (gestures to an object by pointing at the object, grabbing the object, waving the object around, giving the object to the adult, engaging in giving and receiving of the object with the adult, grabbing the object and placing it in front of the adult, mouthing the object or putting the object in his or her mouth, etc.); the child engages in both gazing at the object (or back and forth between the object and the adult) and also gesturing to the object of interest, potentially vocalizing at the same time. An engaged, responsive adult will notice these behaviors and provide a contingent response about the object.

For example, the child is looking at a toy tiger. The adult notices that the child is looking at the toy tiger. The engaged, responsive adult then responds by looking at the toy tiger (or back and forth at the toy tiger and at the child potentially while pointing at the toy tiger) and saying "It's the tiger. The tiger goes roar!" In another instance the child might gesture to the toy tiger by putting the toy tiger in her mouth. The engaged, responsive adult notices this behavior and responds "Look at you! You've got the tiger. That's the tiger. Yes, it is! It's the tiger!" In yet another example we imagine that the child gestures to the toy tiger by pointing to the toy tiger and looking back and forth at the toy tiger and the adult. The engaged adult notices where the child is gesturing and looking and then provides the informational contingent response "It's the tiger!"

This gesture and contingent response is an important part of how children learn about their world. In this process it is helpful to notice where the child is looking and/or gesturing. Each child is unique. Some children will rely more heavily on gesture to elicit information about their world. Other children will tend to elicit information by gazing at an object and/or gazing at an object and then making eye contact with a parent who then provides a contingent response. Still other children will engage in both behaviors simultaneously while also vocalizing to draw the attention of the parent. In order to provide an enriching educational experience that mimics this eye-gaze, gesture, contingent response process it is helpful to have information about where the child is looking and/or where the child is gesturing in order to provide the sort of engaged response that an engaged, responsive parent would provide.

While data on where the child is looking is helpful in order to create the appropriate contingent response, it also allows the present invention to fashion an appropriate output, in the form, for example, of audio, visual, virtual reality, augmented reality, and/or gestural response to the child's area of interest. The present invention determines where it should respond to invoke the salient stimuli in the environment to provide a response.

The present invention may also be used to assist an individual in reading aloud without judgment from a human monitor. Learning how to read and practicing reading out loud can be a stressful and intimidating activity. Reading aloud to a device according to the present invention, particularly when it is in the form of a toy, stuffed animal, or animatronic robot, can be a helpful way for new or struggling readers to get invaluable reading practice without the anxiety of reading in front of peers or adults. Eye-gaze tracking data would provide the present invention with the data necessary to look at the right word (the right location in the book where the child is currently reading) in order to "follow along".

Without eye gaze tracking, data on what, in the environment, the present invention should analyze might otherwise be difficult to come by accurately in real time, especially if new readers skip words or have difficulty with enunciation. The eye-gaze information would also provide information on specific points in the text where the child is struggling (or is staring for some time before pronouncing a word) and where it might be helpful to provide assistance to the child by pointing to the word that the child is struggling with and helping the child sound out the word phonetically or with other teaching techniques. A device of the present invention might then make note of the words with which the child struggles and incorporate them into flashcards for the child or provide this feedback to a teacher or parent so that teachers and parents know where to focus their own efforts. The individualized data from this process could be very helpful to both parents and teachers in providing individualized lessons for the child to target problem areas, suggest more advanced material for readers who are doing well, and also potentially provide timely detection of signs of learning differences. The grace of the system is that the data is acquired with minimal effort and paperwork on the part of the teachers and parents. This could be helpful, especially in schools with larger class size and limited resources where it can be difficult to provide one-on-one attention to all students and where there is the risk of students falling behind or learning differences going unnoticed or unsupported.

The eye-gaze tracking data is of additional value in this scenario when a child might deliberately skip a difficult word or when a child might accidentally skip words simply because he or she is new to reading. If a device were simply attempting to match the audio of the child reading aloud with the text of the book, then the device would likely produce errors when the child skips words, especially if the child's enunciation is unclear as is the case for many young readers. However, with the addition of the eye-tracking data the device will have the information that the child moved past the difficult word and has moved on in the sentence, decreasing the likelihood of program error.

The present invention takes into account these factors to provide a method and apparatus that enhances a child's learning experience. The architecture and techniques of the present invention accepts inputs from the child, processes those inputs, and provides outputs back to the child to provide an interactive learning environment.

As shown in diagram form in FIG. 1, the physical configuration of present invention may take on many different forms. For example, a device of the present invention 101 may take the form of a robot 102. In some implementations the robot contains robotic features such as "eyes" that look in different directions, and/or facial movements that may be controlled via a signal from a CPU and/or computer to one or motors in the robot that controls its expressions. For example, in some implementations the robot would move along a track via step-motor and/or electric motor and/or hydraulic motor and/or a pneumatic system after receiving the signal to move from a computer, CPU or other device. As can be appreciated by those of skill in the art, in some implementations the robot may contain one or multiple figures and/or "hands" and/or pointing object and/or objects and/or anthropomorphic figures and/or zoomorphic figures and/or robotic figures with parts that move via step-motor and/or electric motor and/or hydraulic motor and/or pneumatic system after receiving signal to move from computer, CPU, or other device. In some implementations the figures may include moving parts, such as "arms" or "hands" that move to point in different directions such as pointing at a part of a book in front of the robot or at a toy in front of the robot that the child would like to have identified and discussed; the robot may also include moving parts such as moving "eyes" that move to "look" at a specific part of a book in front of the robot or at a toy in front of the robot that the child would like to have identified and discussed.

The movement of the robot is controlled via computer (and/or CPU or other device) and accomplished via step motor and/or electric motor, and/or hydraulic motor and/or pneumatic system. The signal from the computer (and/or CPU and/or other device) in any of these cases could be received from a proper computer, and/or from a CPU in the robot, and/or from a tablet and/or from a smartphone and/or from a smart device and/or from another robot, and/or from the CPU of the robot itself and/or from the computer of the robot itself.

The signal may be received via any known technology, such as through a connecting cable, through wireless technology via a wireless adapter, through Bluetooth technology via a Bluetooth RF transceiver, or through a specific network system such as Apple's Airplay system, and/or through USB cable connection and/or through lightning port cable connection.

The robotic elements, or objects or figures that move, vocalize, point, "look," mimic a facial expression, and engage in other gestures (on command from the CPU and/or tablet and/or computer and/or smartphone) to help children, especially very young children, understand what they are seeing. For example, the direction of the "eyes" and the gesture of the "arms" of the robot mimic the eye-gaze and gestures of responsive adults. For example, the robot's arm would move to point to a toy sailboat while the computer announced "This is a sailboat" and so forth. The robot may contain one or multiple cameras facing the screen of the computer and/or television and/or one or multiple cameras facing the child/facing out and/or one or multiple speakers and/or one or multiple microphones and/or one or multiple wireless adapters and/or one or multiple Bluetooth receivers and/or one or multiple USB cable connections to other devices. In some implementations the robotic figure may contain a "head" that is actually a touchscreen and/or screen and/or smart device and may be able to, for example, conduct video messaging where, for example, a parent's face would be displayed on the screen of the "head" of the robot when the parent calls via video chat, or where a graphic or video of a character might explain the content of the book would be displayed on the screen "head" of the robot. In some implementations the robot may hold or contain one or multiple touchscreen devices and/or smart devices and/or smartphones and/or one or multiple computers and/or one or multiple tablets.

For example, the present invention may be in the form of a smartphone, tablet, computer, or smart device 103 with one or multiple cameras or simply one or multiple cameras in a wand/or faux smartphone, tray, box, or other such toy that is connected to a smartphone, tablet, computer, or smart device where the child can take a picture of an object. The device then uses object recognition technology to identify the object the child photographed and to provide an audio, visual, or gestural response that tells the child about the object. As an alternative, the device then uses optical character recognition (OCR) technology, optical word recognition technology, intelligent character recognition (ICR) technology, intelligent word recognition (IWR) technology to read a typed or handwritten label on an object such as a toy and to provide an audio, visual, or robotic response that tells the child about the object.

Or, the present invention may be in the form of a smartphone, tablet, computer, or smart device with one or multiple RFID or sensor readers or simply one or multiple RFID or sensor readers in a wand or faux smartphone, or tray, or box, or other such toy that is connected to a smartphone, tablet, computer, or smart device where the child can present the object of interest to the device. The device then scans the RFID or other sensor and provides an audio, visual, or robotic response that tells the child about the object. The device can then use RFID or sensor readers, object recognition, optical character recognition (OCR) technology, optical word recognition technology, intelligent character recognition (ICR) technology, intelligent word recognition (IWR) to identify the object or picture or item of interest to the child and to provide an appropriate audio, visual, or robotic response for example a response that tells the child about the object or about the part of the picturebook that was of interest to the child.

Another form of the present invention is an eye gaze tracking device 104 either in the form of one or multiple cameras pointed at the child collecting data about where the child is looking or infrared eye gaze tracking or infrared or camera-based eye gaze tracking in a device such as goggles or glasses worn by the child. Such goggles or glasses may also include one or multiple cameras facing outward from the child to capture information about the world around the child and/or about what the child is seeing. The eyegaze tracking devices may be embedded in or connected to a smartphone, tablet, computer, smart device, home device, or robot through Bluetooth, Wi-Fi, or a physical connection such as USB, Ethernet, etc. Through this connection the device receives information about where the child is looking and through this information what is of interest to the child.

As can be appreciated by the above example, the form of the method and apparatus of the present invention can vary depending on the learning environment. The input, one or more program modules, and output may all take on different forms to perform different functions associated with the learning environment.

Figure 2:
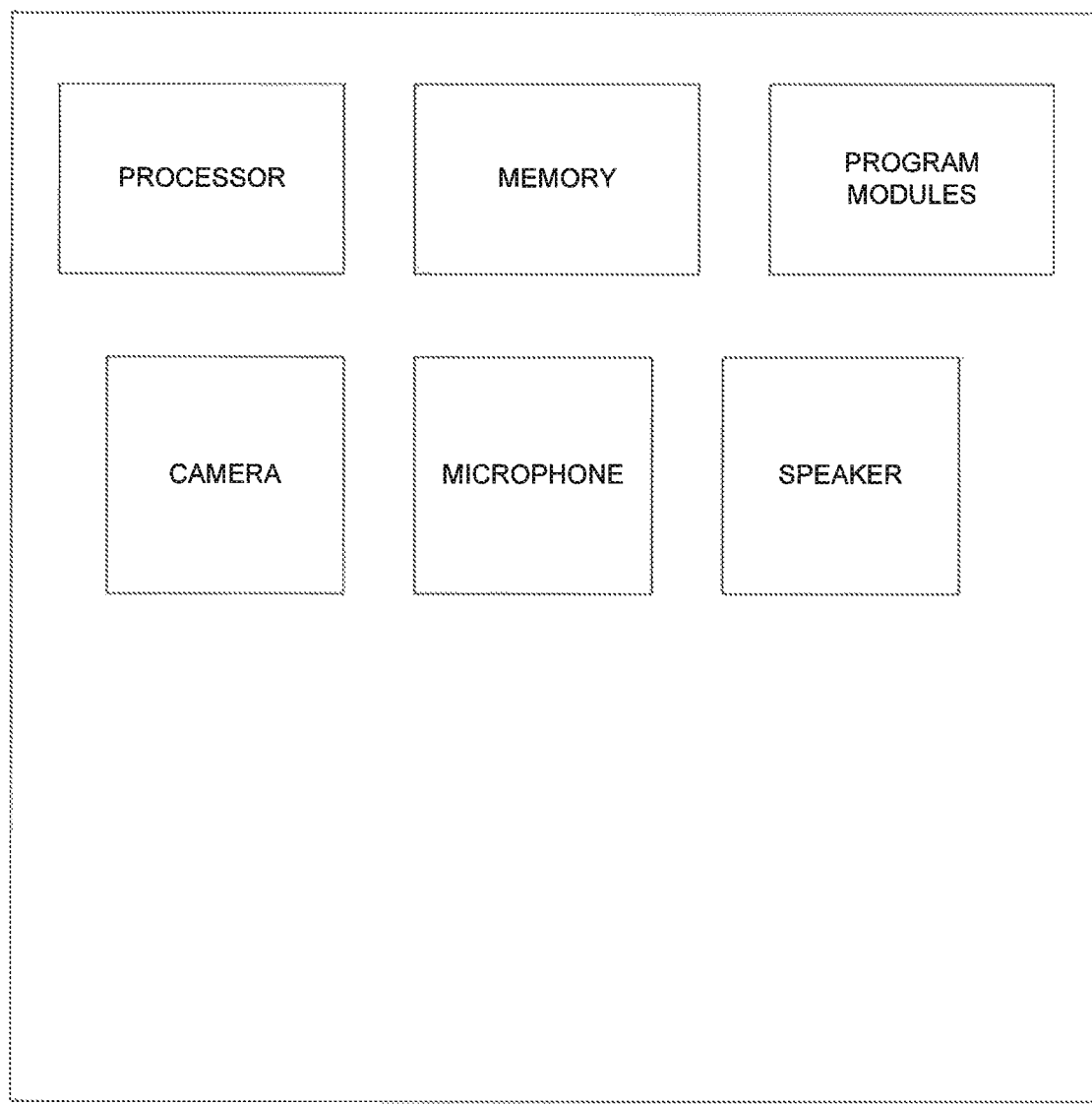
FIG. 2 is a representation of an embodiment of the present invention.

As shown in FIG. 2, one embodiment as a device has a processor; a memory accessible by the processor, the memory storing one or more program modules executable by the processor; a camera; a microphone; a speaker; wherein said one or more program modules is capable of receiving audio data from said microphone and recognize the speech associated with a particular user of the device based on received audio data; wherein said one or more program modules, when executed by the processor, is capable of receiving video data from said camera sufficient to determine the direction of eye gaze of a particular user of the device based on said received video data; and wherein the program modules are capable of causing audio information to be transmitted from the speakers the said computing device.

As shown in FIG. 2, an input device may comprise a gesture tracker, wherein a video camera of the present invention monitors and tracks the physical gestures of the child. The video camera may also be configured to recognize facial expressions of the user. The method and apparatus of the present invention may include a touch pad device for input, in place of or in addition to other input devices. The input device may include a sensor device which may, for example, track the movement of a user's body, including arms, legs, and head. The input device may constitute a passive RFID device to read information from an associated RFID transmitting device used by the user, or in the proximity of the user.

As will be understood by those skilled in the art, the exact input devices utilized by the present invention may vary.

For example, in some implementations a device of the present invention may contain an eye-gaze tracker that is an infrared or near-infrared tracker. The eye-gaze tracker may have one or multiple cameras, or may be in the form of goggles, glasses, or other headwear containing cameras and/or infrared and/or near-infrared tracking.

In some implementations a device of the present invention may contain one or multiple cameras facing the child and/or children and/or robot and/or robots to track the child and/or children's facial expressions, gestures, activities, and like information. In other implementations the device may contain a mask with one or multiple sensors that registers the facial expressions and facial movements of the child and that transmits this data for processing. In still other implementations the device may contain one or multiple cameras on a clip on the child's clothing and/or on goggles or glasses worn by the child, and/or on head gear for the child and/or in a robot facing the child and/or one or multiple cameras facing forward from the child capturing what the child sees and/or what is happening in the child's environment and/or one or multiple cameras in stands or objects near the child where the camera data is transmitted by the appropriate means.

The present invention may also include conductive surfaces such that the conductive surface when placed on a touchscreen device acts as a code for an application running on the touchscreen device. For example, a plastic, three dimensional toy letter in the shape of the letter "A" where one side of the letter is made of conductive material and the letter toy contains either a battery or other conductor or is designed so that when the letter is being held the electricity from the human hand is conducted via the letter, then when the conductive letter is placed on a touchscreen the touchscreen device reads the shape of the letter A and then an application might use that information to provide an audio output about words that start with the letter "A" or even simply to provide audio output that says "This is the letter 'A'!" Similarly, a set of plastic toy animal figures might be designed where the bottom of each toy animal is both conductive and a unique shape such that when the toy animal tiger is placed on the touchscreen an application on the touchscreen device will be able to identify that this is the toy tiger because of the conductive shape formed by the base of the toy tiger. The touchscreen device might then have an audio output saying "This is a tiger!" or playing a song about a tiger or so forth. These conductive objects could be used on any touchscreen surface.

In still other instances a device of the present invention may include any one or a combination of motion detectors and/or motion sensors, either worn by the child or attached to the device, or both. The devices can be worn on the finger or fingers of the child to capture gestures, such as pointing and waving, made by the child. The sensors and/or motion detectors on the finger may be worn on the finger may be attached to or part of a ring, adjustable ring, glove or other device, or multiple versions thereof.

In other instances a device of the present invention may include a stylus with a conductive tip and/or the ability to write on touchscreen. The stylus may have the appropriate sensors, including motion sensors, one or more cameras, one or more RFID readers, one or more barcode scanners, one or more touchscreens. The input of the device may be multiple pointing objects, such as a plastic and/or metal wand or toy, with the appropriate inputs as set forth above.

A device of the present invention may include audio recording devices or audio receivers and/or microphones.

A device of the present invention may also include one or more remotes or remote-type devices with buttons that may accomplish the following: allow the child to input feelings (for example, including but not limited to by pressing a smiley face, sad face, scared face, bored face, hungry, thirsty, juice, water, milk, different types of snacks, dirty diaper, etc.); seek help (for example by pressing a button to call a parent or a first responder); move forward to the next page in a book or next screen in a digital book; move backward to the previous page in a book or previous screen in a digital book; a specialized remote such as a "What is this?" button, which the child could press when he or she would like to have an object identified or when he or she is pointing to something in a book or on a screen and/or looking at something in a book or on a screen and would like to have the image identified; an "again" or repeat button (to have the most recent statements or music repeated); a "Call Mom and Dad" button (to call or video-chat with Mom and Dad); a call for help button; a "hungry" button when the child would like to request a food; a "thirsty" button when the child would like to request a drink; a "sleepy" button when the child is getting sleepy, etc.

Buttons could also include a variety of buttons more specific to certain learning stages such as a "How many?" button or a "What color is this?" button and so forth. The buttons could be actual physical buttons in metal or plastic and/or they could be graphically represented buttons on a touchscreen on the device and/or they could be listed on a screen with physical buttons next to the descriptors on the screen. The buttons could contain graphics and/or images in lieu of text and/or they could contain text descriptors. As stated above with the remote these non-verbal methods of communicating with the child are very helpful because language learners may not yet be able to form the questions we use to communicate and learn and providing language learners with another means to communicate should make for a smoother, less frustrating educational experience for the child.

In some implementations the remote could be an actual, physical remote such as is used for television that sends signals via LED (light emitting diode), in other implementations the remote could be a device with buttons that connects and/or sends signals via methods known in the art. In some implementations the remote can interact with other household devices or include a phone, video calling, or mobile phone capabilities.

By way of a further example, the following are several examples of inputs for a baby. Note that the inputs (and the relevant processing) might be different for a toddler or pre-school aged child:

a. Child vocalizes, points, holds something and waves it around
b. Child puts something in his or her mouth
c. Child kicks legs, waves arms, etc.
d. Child cries, or child cries for prolonged period of time, raising fear of dehydration or illness
e. Child giggles
f. Child has specific facial expression that is meaningful to the apparatus and to which the apparatus is programmed to process
g. Child has tone of voice that is meaningful to the apparatus and to which the apparatus is programmed to process
h. Child looks sleepy/looks like he she is getting fussy or sleepy
i. Child looks at something, especially for prolonged period of time
j. Child makes facial expression such as smiling
k. Child does something physical such as walking or dancing
l. Child brings the apparatus a book or toy and gives the book or toy to the apparatus
m. Child is sleeping
n. Smoke detected in area of child
o. Stranger detected in vicinity of child
p. Home alarm system detects breach The one or more program modules of the present invention process the input, alone or in combination with other inputs, so that a response may be determined. The processing steps can take many forms to assist in processing the inputs, including SLAM technology (simultaneous localization and mapping), object, voice, speech, and/or sound recognition, emotion recognition, gesture recognition, and/or eye gaze tracking (through algorithms, software, and other systems).

The processing can thus be configured in a manner known in the art to provide the appropriate response. For example, in the context of a child reading the book, the processing would account for the child's physical gestures (such as eye gaze and pointing), note where in the book the child was having difficulty (by way of determining the portion of the page of the book), and perhaps note a verbal input such as the word "What?" Those processing of the apparatus would take those inputs, determine from them an appropriate response, and then provide the response. In this example, the processing would note that the child is looking at a page of the book with a tiger and note facial expressions showing difficulty and frustration, and respond with the verbal output of "It's a tiger!"

The program modules thus allow interchangeability and adaptability for the device depending on many factors, including the user's age, the user's academic level or proficiency, the user's immediate environment, and the activity engaged in by the user, such as reading a book.

As will be understood by those skilled in the art, the exact program modules vary in their application. The modules may utilize any of the following, alone or in combination: simultaneous localization and mapping (SLAM) technology; object recognition software and/or object recognition algorithms and/or object recognition systems; voice recognition and/or speaker identification technology. The speech recognition may utilize known systems, such as speech to text technology, voice user interfaces, voice dialing (e.g. call Mom), domotic control of other devices, automatic speech recognition, end-to-end speech recognition, speech to text processing, speech search technology (i.e. to answer questions), and intelligent assistant technology.

The present invention may also include sound recognition and/or sound search and/or sound identification (e.g. identifying a bark of a dog or a child crying or the type of cry) technology and/or software and/or applications. The sound recognition may take different forms, such as music recognition and/or music search and/or music identification; the ability to recognize pitch, speed, and volume of speech as inputs to determine emotions of speaker (e.g. distress or happiness of child, or confusion/question in one-word statements by child "dog?" versus "dog!"); to ability to distinguish sounds such as an individual crying.

The modules of the present invention may accomplish, for example, processing to accomplish tasks such as: tracking software and/or tracking application to track the time the child is sleeping, playing, eating, etc. and to provide data to an application and/or software and/or alert system for parents and/or teachers and/or caregivers etc.; software to predict when child is most likely to be successful in learning, to get hungry, to need a nap; software to note patterns of behavior and growth of knowledge over time and to increase the level of the response and/or the level of the interaction with the child; interaction with other household devices such as sleep monitors and receive data from household devices such as sleep monitors; automatic content recognition technology and/or software and/or applications; the ability to identify what a child is doing in a live context (i.e. recognize that a child is jumping up and down or dancing); the ability to identify what a child is doing in a live context specifically the gestures the child is making (for example recognizing that a child is pointing or making the baby sign language sign for more food, etc.).

As will be understood by those skilled in the art, the exact output devices utilized by the present invention may vary. They may include auditory output, physical output, gesture output, visual output, and a sensory output such as a vibratory output.

The output device may also comprise a movable device that reacts to the operation of the program modules and physically moves. For example, the output device may constitute a mechanical arm that can point to words or pictures in a book or other items in the user's environment, or it may comprise animatronic eyes that move to catch the attention of the user and direct his or her gaze to something in the user's environment. The output device may also comprise a projector device that projects images or data for the user in the user's environment. For example, in some implementations the disclosure contains robotic elements such as robot "arms" and/or robotic "hands" and/or robotic "paws" (and/or flippers and/or zoomorphic appendages) that are controlled via step-motor and/or electric motor and/or hydraulic motor and/or pneumatic system after receiving a signal to move from computer or other device. In other implementations the movements of the robotic "arms" and/or robotic "hands" and/or robotic appendages are able to "point" and/or "wave" and/or signal using baby sign language and/or signal using other sign language. In still other implementations the device would be able to hold and manipulate objects, such as holding and turning the pages of a book.

With the outputs the present invention can perform multiple operations, such as, in the appropriate form, moving (walking, running, dancing), rocking, and make the appropriate audio inputs in conjunction with movement.

Gesture output may occur by multiple step, electric, hydraulic, pneumatic, or other systems that are known in the art.

Visual outputs may include one or more of the following: one or multiple projectors; a heads-up display; a hologram, especially a heads-up hologram; touchscreens; laser pointers and/or directed light sources; and video devices such as computers, televisions, and other devices.

Outputs would be dependent on the programming of the processing techniques. For example, possible outputs for the apparatus educating a baby may include:

a. Apparatus says something: Apparatus repeats child's vocalization but with proper grammar and pronunciation; Apparatus comments or narrates what the child is doing or feeling "You are happy" "You are walking"; Apparatus provides vocalization naming object and repeats this vocalization while pointing and looking, either looking at the object and then at the child or some combination of the two, or Apparatus asks child question such as: Asking the child to find a particular object such as a tiger or a block with the letter A; Asking child to find object of particular color or shape; or Asking child to find certain number of objects b. Apparatus does nothing c. Apparatus plays music d. Apparatus points/gestures e. Apparatus bot and child walk or sit in room. The bot will point and gesture and vocalize about different things in the room to teach vocabulary (with or without baby pointing first)

f. Apparatus picks up object and/or picks up and moves object g. Apparatus provides digital image or picture of a word and an object
h. Apparatus draws either on digital or on physical paper, such as modeling drawing letters
i. Apparatus reads physical book or digital book to child, while being observant and responsive to the child's interests
j. Apparatus alerts first responders to emergency via phone, text, or some other system
k. Apparatus alerts parents that child is crying, awake, hungry, etc.
l. Apparatus uses physical movement to model behavior or to play i.e. models behavior such as dancing, building with blocks, waving hello, pointing or plays with child i.e. build or play by stacking blocks or sorting objects by color or moving object as directed by child
m. Apparatus sleeps/closes eyes
n. Apparatus makes eye contact with child or other person.

The input, output, and one or more program modules may be connected by various means, or a combination thereof, including the following: direct cable connection, USB connection, Wi-Fi connection, Bluetooth connection, wireless connection, cellular connection, and similar devices.

The physical form of the method and apparatus of the present invention may also vary, and include common items such as a stuffed animal, a 'robot,' or simply an iPad device with an attachable, movable pointing device. In some implementations the disclosure contains a plastic and/or metal object and/or plastic or metal or wood figure and/or plastic or fabric or other material stuffed toy. In some implementations the plastic or metal object may contain a camera that may be able to stand alone and may be mounted or unmounted. For example, the plastic or metal object might be shaped like a magic wand with a star on the end or the plastic and/or metal casing might be shaped like a faux smart-phone or like a toy designed to look like a parent's smartphone in the same way that children's toy "keys" are designed to look like a parent's keys. In another example the plastic and/or metal device might be designed to look like a dog dish where the cameras are embedded around the rim facing the center while others face outwards. In another example the plastic or metal object might be a stuffed toy such as a teddy bear. In another example the plastic and/or metal object might be a plastic figurine such as a baby doll type of toy or action figure type of object. In some implementations the robot may contain one or multiple figures and/or "hands" and/or pointing object and/or objects and/or anthropomorphic figures and/or zoomorphic figures and/or robotic figures with parts that move via step-motor and/or electric motor and/or hydraulic motor and/or pneumatic system after receiving signal to move from computer, CPU, or other device. In some implementations the figures may include moving parts, such as "arms" that move to point in different directions such as pointing at a part of a book in front of the robot or at a toy in front of the robot that the child would like to have identified and discussed; the robot may also include moving parts such as moving "eyes" that move to "look" at a specific feature.

The device may be capable of being attached to various items, such as the sides of a play-pen, the back of a car seat, a stroller, or a safety car seat. It may thus be a stand-alone device, or one that can be readily attached to an item in the user's environment.

The inputs, outputs, and processing would change with the learning ability of the person who is using the device. For example, a toddler might have the same inputs to the device as the baby, but include the child reading to the bot, with the child's gaze tracking the words as he or she reads them; the child looking at the bot when he or she is stuck on a word; or the child struggling to make sense of the word or understand the word, with several attempts to pronounce the word. The output would then, based on the processing that is configured into the device, include: the bot being responsive to a child struggling to read by supplying word and also noting it in data as word to work on, possibly sending an end of day report to parents or teachers; the bot introducing rare or unusual vocabulary words through lessons (perhaps one per day in morning or throughout day); the bot alerting parents, the bot encouraging narrative development and storytelling, the bot preventing child from falling while learning to walk/run etc., or the bot engaging in play with a ball.

For a pre-school age child, the inputs and outputs would again change with the learning ability of the child, with inputs including talking about people who are not present, talking about the past or future, or sharing drawings. The outputs would include responses such as asking questions about stories or suggesting stories to tell in the future, ask decontextualized questions to engage the child in a discussion, or encouraging narrative or storytelling.

The following examples demonstrate the present invention in different embodiments and operations. The examples relate to a device that has various input and output devices, memory accessible by at least one processor, the memory storing data and/or one or more program modules (such as a gaze tracking module) executable by the processor, where the program modules, when executed by the processor, are capable of various actions. Nothing in these examples is meant to limit the scope of the invention.

EXAMPLE

Child-Led Play

Figure 3:
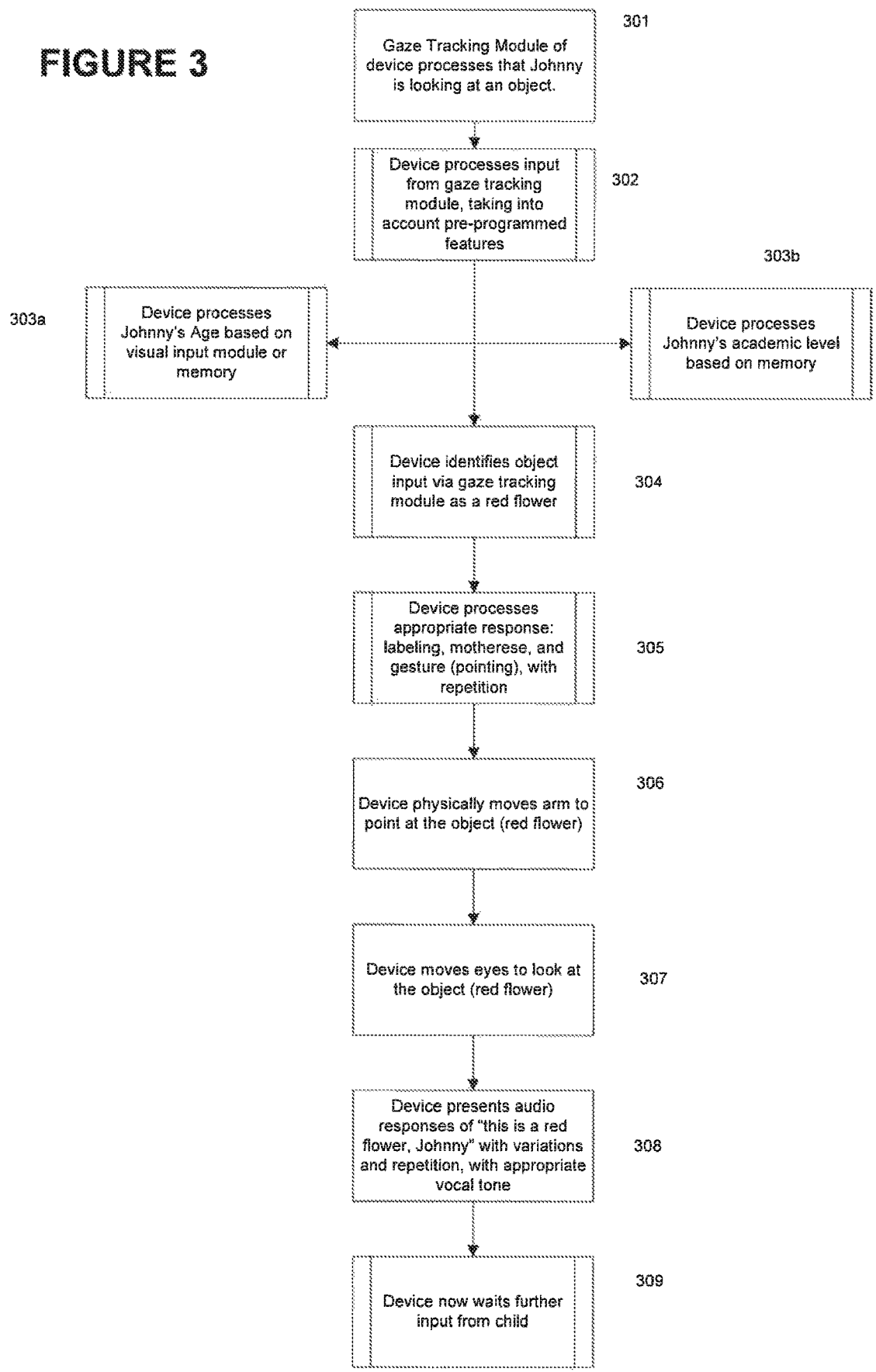
FIG. 3 is an example of operation of the present invention.

FIG. 3 sets forth the following operation of the present invention. This learning scenario involves Johnny, a six-month old baby, engaged in child-led play with the device configured as a robot. The robot is configured to be responsive to Johnny as Johnny looks around and points to different objects.

In step 301 a gaze tracking module of the device configured as a robot processes Johnny's gaze and determines that Johnny is looking at a particular object.

In step 302, the device configured as a robot processes the input from the gaze tracking module, taking into account other information stored in the memory of the device (such as the appropriate identification of various objects in the room).

In step 303a and 303b, the device configured as a robot processes Johnny's age or academic level. The device configured as a robot may process from information stored in memory that Johnny is six months old (via earlier input from a parent), may process from information stored in memory that Johnny is at an particular academic level, or the device configured as a robot may receive a video image of Johnny via a camera, and process that image to determine that Johnny has physical features appropriate to a six-month old child.

In step 304, the device configured as a robot identifies the object that Johnny is gazing at as a red flower.

In step 305, the device configured as a robot processes the inputs to determine an appropriate output: for a baby six months old, a proper response programmed for the apparatus might be labeling, use of "motherese," and gesture—particularly pointing, with repetition.

In step 306, the device configured as a robot provides an output by physically moving its arm (by appropriate electrical, mechanical, or other means) to point at the red flower.

In step 307, the device configured as a robot may provide an eye gaze output by moving the robots eyes to look at the flower in the room.

In step 308, the device configured as a robot provides the audio response via an audio module of "This is a red flower, Johnny." The response would be repeated, identically or with slight variations such as "Look Johnny, it's the red flower." The processing would also indicate that the verbal response is to be in a high-pitched, encouraging voice.

In step 309, the device configured as a robot would then await further input from the child, and continue to monitor the child, for example by a camera to determine Johnny's facial expression or body language for further processing.

EXAMPLE

Device Responsive to Physical Inputs

Figure 4:
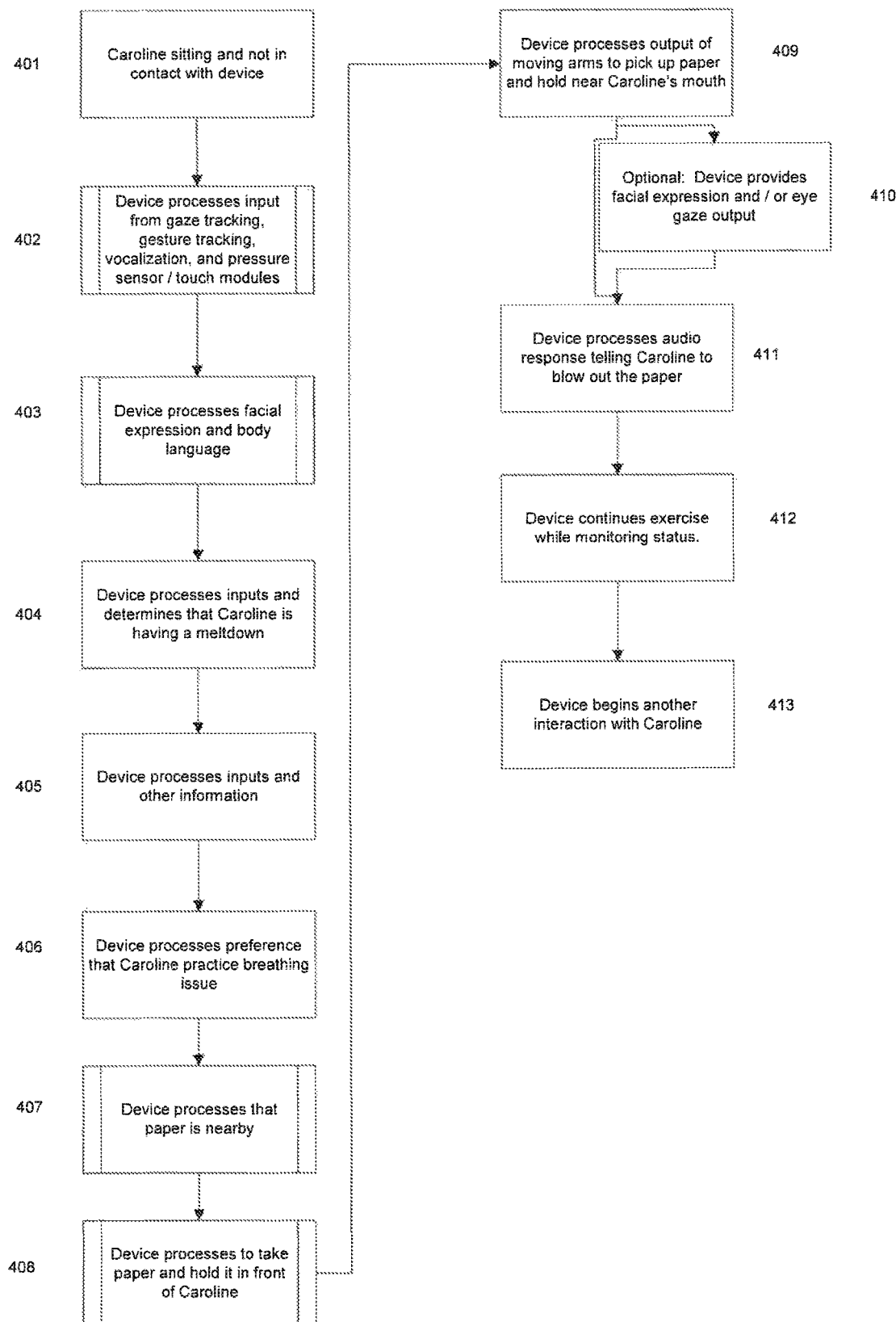
FIG. 4 is an example of operation of the present invention.

FIG. 4 sets forth the following operation of the present invention. This learning scenario involves Caroline, a three year-old, engaged in a meltdown with the device configured as a robot. The robot is configured to be responsive to Caroline and to help Caroline control her breathing and calm down. The robot has been configured to help Caroline calm down by using a breathing technique where Caroline will blow on a piece of paper until she is calm enough to talk about her feelings. This technique was selected by Caroline's parents and preschool teacher.

In step 401, the device configured as a robot processes that Caroline is sitting with her fists clenched, eyes shut tightly, screaming and crying, and that Caroline is not in contact with the robot. A person identification module of the device configured as a robot has already identified that this person is Caroline.

In step 402, a gaze tracking module of the device configured as a robot processes that Caroline's eyes are shut tight; a gesture tracking module of the device configured as a robot processes that Caroline's fists are clenched; a vocalization module of the device configured as a robot processes that Caroline is vocalizing by screaming and crying loudly; and a pressure sensor/touch sensor module of the device configured as a robot processes that Caroline is not in contact with the device configured as a robot.

In step 403, a facial expression module and body language module of the device configured as a robot processes that Caroline is distressed.

In step 404, the device configured as a robot processes the information and determines that Caroline is having a meltdown.

In step 405, the device configured as a robot processes the input from the gaze tracking module, the gesture tracking module, the vocalization tracking module, the pressure sensor/touch sensor module, the object identification and character identification modules, the facial expression and body language modules, and the data collection module taking into account other information stored in the memory of the device (such as Caroline's parents' preferences for social-emotional learning and recognition).

In step 406, a data collection module of the device configured as a robot, with the permission of Caroline's parents, processes the fact that Caroline's parents and teacher prefer to have Caroline practice a paper breathing exercise to calm down when she has a meltdown.

In step 407, an object recognition and character recognition module of the device configured as a robot processes that there is a piece of paper nearby.

In step 408, the device configured as a robot processes the best course of action to support Caroline is to take the nearby piece of paper, hold it in front of Caroline's mouth, and tell Caroline to blow, and to repeat this step until Caroline is calm enough to talk about her feelings.

In step 409, the device configured as a robot processes an output by physically moving its arm (by appropriate electrical, mechanical, or other means) to pick up the nearby piece of paper and to hold it in front of Caroline's mouth.

In step 410, the device configured as a robot may process an eye gaze output by moving the robot's eyes to look at Caroline.

In step 410, the device configured as a robot may process a facial expression output by moving the robot's facial muscles to look calm and serene.

In step 411, the device configured as a robot would process the audio response via an audio module of "Ok, Caroline, blow, blow, blow, blow, blow out the paper as hard as you can. Blow, blow, blow. Keep blowing Caroline." The processing would also indicate that the verbal response is to be in a calm and soothing voice.

In step 412, the device configured as a robot would continue to repeat the blowing exercise while monitoring Caroline's status for example by a camera to determine Caroline's vocalized response, as well as her facial expression or body language for further processing, as well as her eye gaze and gesture.

In step 413, When Caroline is calm enough the device configured as a robot would, for example, move on to helping Caroline discuss her feelings and what made her upset.

EXAMPLE

Reading Assistance

Figure 5:
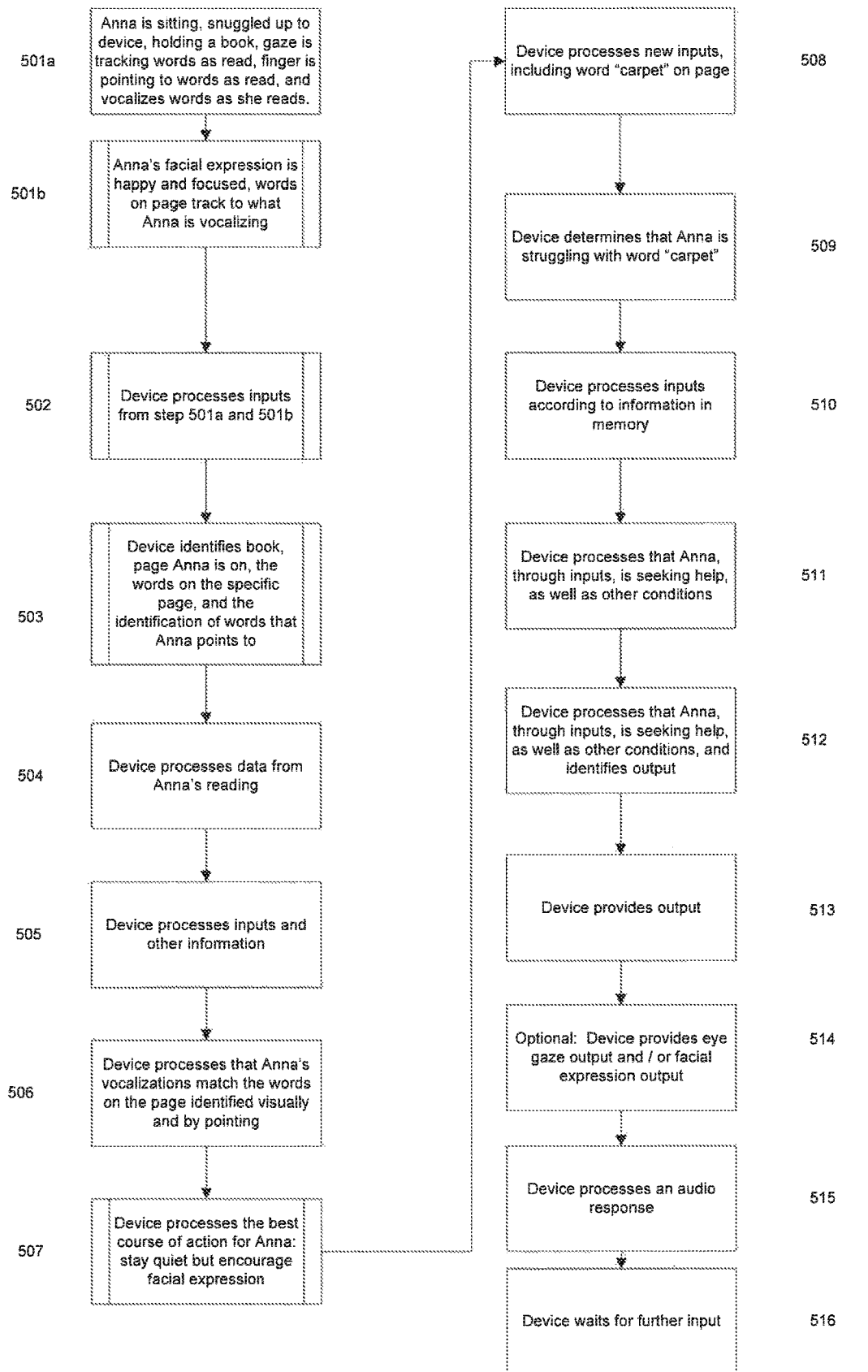
FIG. 5 is an example of operation of the present invention.

FIG. 5 sets forth the following operation of the present invention. This learning scenario involves Anna, a four year-old, engaged in reading with the device configured as a robot. The robot is configured to be responsive to Anna as Anna reads to the robot. The device configured as a robot is aware of Anna's reading level, words Anna struggles with, words Anna knows well, best practices from teachers for helping Anna as she practices reading, and also Anna's stamina in reading, specifically, that Anna can get tired or frustrated half-way through a book. The robot has been configured to respond to cues that Anna is struggling with a word and has also been configured to provide educator-researched support for Anna when she struggles.

In step 501*a*, the device configured as a robot determines that Anna is sitting, snuggled up to the robot and that Anna is holding a book, that Anna's gaze is tracking the words as she reads, that Anna's finger is pointing to the words as she reads, that Anna is vocalizing the words as she reads. In step 501*b*, Anna's facial expression is happy and focused, and that the words on this page of the book are "x" which tracks to what Anna is vocalizing, meaning Anna is reading correctly.

In step 502, a person identification module of the device configured as a robot has identified that the person is Anna. A gaze tracking module of the device configured as a robot processes that Anna is gazing and determines that Anna is looking at a book, and specifically that Anna's gaze is tracking as she reads. A gesture tracking module of the device configured as a robot processes Anna is pointing and determines that Anna is pointing at a book, and specifically that Anna's is pointing to each word as she reads. A vocalization module of the device configured as a robot processes that Anna is vocalizing and determines that Anna is vocalizing the words as she reads. A pressure sensor/touch sensor module of the device configured as a robot processes that Anna is snuggled up against the robot, cuddling the robot as she reads to her robot "friend." A facial expression module and body language module of the device configured as a robot processes that Anna has the facial expression typical to Anna, as an individual child, when she is happy and focused.

In step 503, an object recognition and character recognition module of the device configured as a robot has already identified that Anna is reading a specific book, what page she is on, what words are on this page, and also specifically identified each word as Anna points to it or gazes at it.

In step 504, a data collection module of the device configured as a robot processes Anna's reading speed, her confidence level with words in order to infer words she knows well and is struggling with, and will later use this data to prepare a message for her parents about which words Anna is excelling with and which words they should try to practice with Anna more often.

In step 505, the device configured as a robot processes the input from the gaze tracking module, the gesture tracking module, the vocalization tracking module, the pressure sensor/touch sensor module, the object identification and character identification modules, the facial expression and body language modules, and the data collection module taking into account other information stored in the memory of the device (such as the appropriate identification of the book, Anna's age, Anna's reading level, specific words Anna is still learning, specific words Anna knows well already, specific words Anna's teacher would like the bot to emphasize today, specific teaching techniques that work well for Anna).

In step 506, the device configured as a robot processes that Anna's vocalizations match the words on the page that Anna is looking at and pointing to.

In step 507, the device configured as a robot processes the best course of action to support Anna is to continue an encouraging facial expression but to stay quiet.

In step 508, a gaze tracking module of the device configured as a robot processes that Anna is now gazing up at the robot's "eyes". A gesture tracking module of the device configured as a robot processes that Anna's finger is resting on a particular word on the page, "carpet". A vocalization module of the device configured as a robot processes Anna has ceased vocalizing. A pressure sensor/touch sensor module of the device configured as a robot processes Anna is still snuggled up against the robot, cuddling the robot as she reads. A facial expression module and body language module of the device configured as a robot processes that Anna has the facial expression typical to Anna, as an individual child, when she is seeking help. A person identification module of the device configured as a robot has already identified that this person is Anna. An object recognition and character recognition module of the device configured as a robot has already identified that Anna is reading a specific book, what page she is on, and that the particular word that Anna's finger is resting on is the word "carpet".

In step 509, a data collection module of the device configured as a robot determines that Anna is struggling with the word "carpet".

In step 510, the device configured as a robot processes the input from the gaze tracking module, the gesture tracking module, the vocalization tracking module, the pressure sensor/touch sensor module, the object identification and character identification modules, the facial expression and body language modules, and the data collection module taking into account other information stored in the memory of the device (such as the appropriate identification of the book, Anna's age, Anna's reading level, specific words Anna is still learning, specific words Anna knows well already, specific words Anna's teacher would like the bot to emphasize today, specific teaching techniques that work well for Anna).

In step 511, the device configured as a robot processes that Anna is exhibiting the facial expression and behavior typical when a child learning to read wants an adult to help with a specific word. The device configured as a robot further processes based on past reading practice with Anna that this is the specific way that Anna, as an individual child, likes to ask for help. The device configured as a robot also processes from prior reading experience with Anna, or perhaps from inputs from Anna's parents or kindergarten teacher, that Anna does not know the word "carpet" by sight but that Anna does know her alphabet letters, the sounds that correspond to her alphabet letters, and that Anna knows the word "car" and the word "pet" but that Anna's parents and teachers want Anna to focus on sounding out new words phonetically. The device configured as a robot processes that Anna tends to get tired by the end of her reading but that because she is currently half-way through the book she should be alright with the energy and effort required to sound out a difficult word.

In step 512, the device configured as a robot processes the inputs and identifies the appropriate output: for Anna, an individual child, who knows her letters and their corresponding sounds and whose parents and teacher have configured the device to use the sounding out approach when Anna struggles with a word and have also asked the robot to make note of new words and to send an alert to the parents and teacher so that they can continue to practice the new word with Anna, within the context of processing that pointing, directed eye gaze, and a puzzled but encouraging facial expression help Anna. Therefore the appropriate output is to point and look at the word with an encouraging facial expression.

In step 513, the device configured as a robot provides an output by physically moving its arm (by appropriate electrical, mechanical, or other means) to point at the word "carpet".

In step 514, the device configured as a robot may process an eye gaze output by moving the robot's eyes to look at the word "carpet," or a facial expression output by moving the robot's facial muscles to look puzzled but encouraging.

In step 515, the device configured as a robot processes an audio response via an audio module of "Hmmm, that's a new word but I bet we can get better at reading it if we try! Should we try to sound it out together?" The processing would also indicate that the verbal response is to be in a high-pitched, encouraging voice.

In step 516, the device configured as a robot would then wait further input from the child, and continue to monitor the child, for example by a camera to determine Anna's vocalized response, as well as her facial expression or body language for further processing, as well as her eye gaze and gesture.

EXAMPLE

Foreign Language

Figure 6:
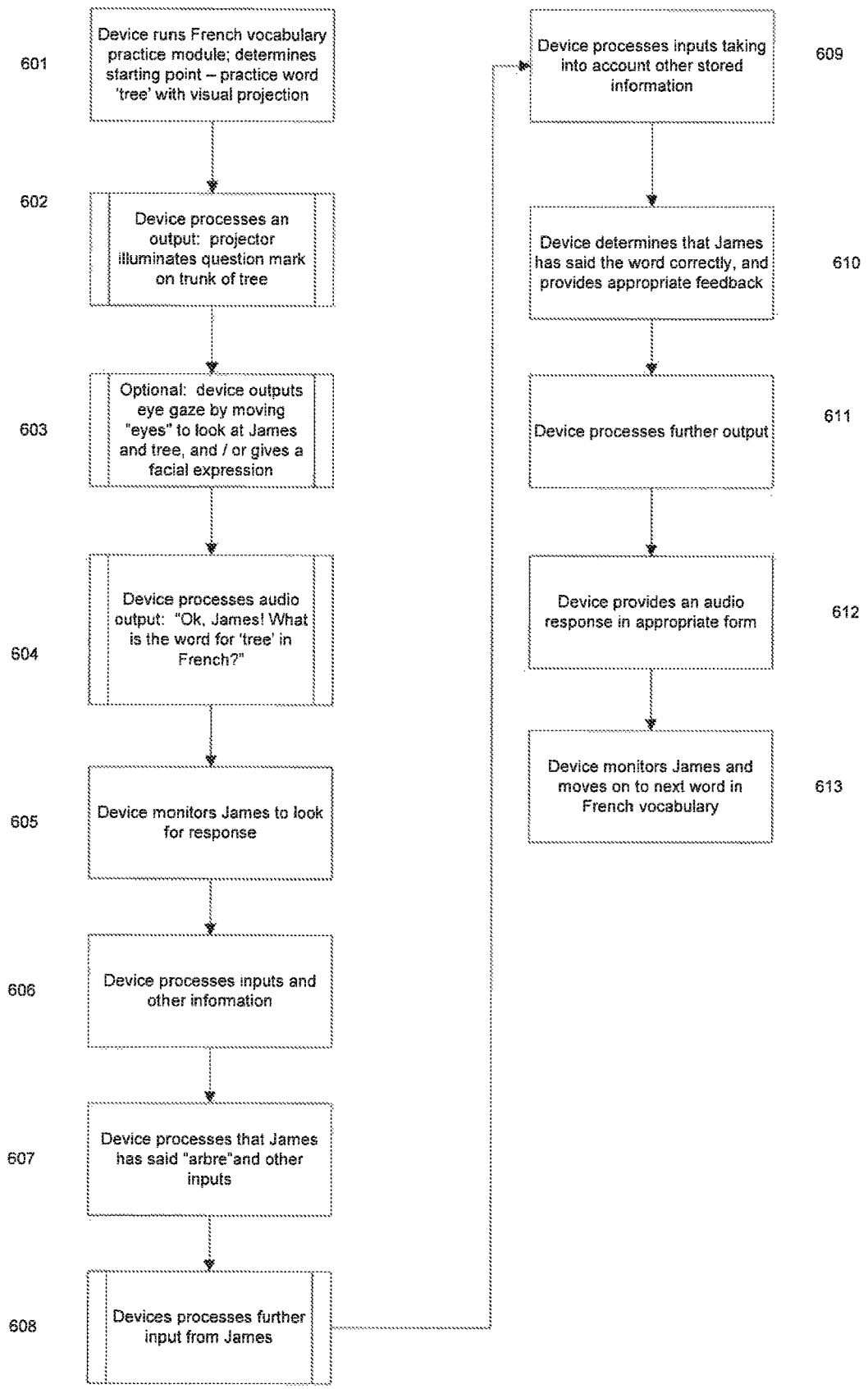
FIG. 6 is an example of operation of the present invention.

FIG. 6 sets forth the following operation of the present invention. This learning scenario involves James, a ten year-old, engaged in French language practice with the device configured as a robot. The robot is configured to help James practice a specific list of French vocabulary words which the robot processes James has been assigned for French homework. The device configured as a robot also processes from prior input from James' parents that James loves the outdoors and will get more out of his French practice if James is allowed to practice outside. The robot is configured to be responsive to James as he practices.

In step 601, the device configured as a robot begins to run the French vocabulary practice module created for James for his French vocabulary homework. The device processes the lesson plan module for the French vocabulary practice and determines that the output it should begin with is practicing the word "tree" by shining a question mark on a tree, looking at a tree, and vocalizing a question for James.

In step 602, the device configured as a robot processes an output by directing its projector (by appropriate electrical, mechanical, or other means) to illuminate a question mark on the trunk of a nearby tree, which would have been identified using object identification.

In step 603, the device configured as a robot may provide an eye gaze output by moving the robot's eyes to look at James and then to look at the tree, and/or may provide a facial expression output by moving the robot's facial muscles to look encouraging.

In step 604, the device configured as a robot would process an audio output via an audio module of "Ok, James! What is the word for 'tree' in French?" The processing may also determine that because James is ten-years old he will be most engaged in a lesson with the voice of his favorite super-hero and thus the robot would use the voice of James' favorite superhero in this lesson.

In step 605, the device configured as a robot would look for a response from James by monitoring for vocalizations, gesture, eye-gaze, facial expression, and so forth.

In step 606, a gaze tracking module of the device configured as a robot notices James is gazing at the tree and then at the bot; a gesture tracking module of the device configured as a robot notices that James is not gesturing; a pressure sensor/touch sensor module of the device configured as a robot notices that James is not touching the robot.

In step 607, a vocalization module of the device configured as a robot processes that James has said "arbre", and a facial expression module and body language module of the device configured as a robot processes that James has the facial expression typical to James, as an individual child, when he is happy and confident in his answer.

In step 608, an object recognition and character recognition module of the device configured as a robot has identified that the object James is looking at a tree. A data collection module processes that James has responded to the query in a quick manner and with no error.

In step 609, the device configured as a robot processes the input from the gaze tracking module, the gesture tracking module, the vocalization tracking module, the pressure sensor/touch sensor module, the object recognition and character recognition modules, the facial expression and body language modules, and the data collection module taking into account other information stored in the memory of the device (such as the words and pronunciation the French teacher would like James to use).

In step 610, the device configured as a robot processes that James's vocalizations match the correct vocabulary word and pronunciation for the word for tree in French. The device configured as a robot determines that the appropriate output is to provide positive feedback that James enjoys, in this case, a digital confetti image and a "hooray sound" as well as the word "arbre" is projected onto the tree trunk.

In step 611, the device configured as a robot provides an output by directing its projector (by appropriate electrical, mechanical, or other means) to project the image of the word "arbre" surrounded by exploding confetti on the trunk of the nearby tree, which would have been identified using object identification. The device configured as a robot may further provide an eye gaze output by moving the robot's eyes to look at James and then to look at the tree, and/or may provide a facial expression output by moving the robot's facial muscles to look happy.

In step 612, the device configured as a robot would provide the audio response via an audio module of "Correct!" The processing would also indicate that because James is ten-years old he will be most engaged in a lesson with the voice of his favorite super-hero and thus the robot would use the voice of James' favorite superhero in this lesson.

In step 613, the device configured as a robot continues to monitor James while moving on to the next word in the French vocabulary lesson plan module.

EXAMPLE

Response to Baby Expressions

Figure 7:
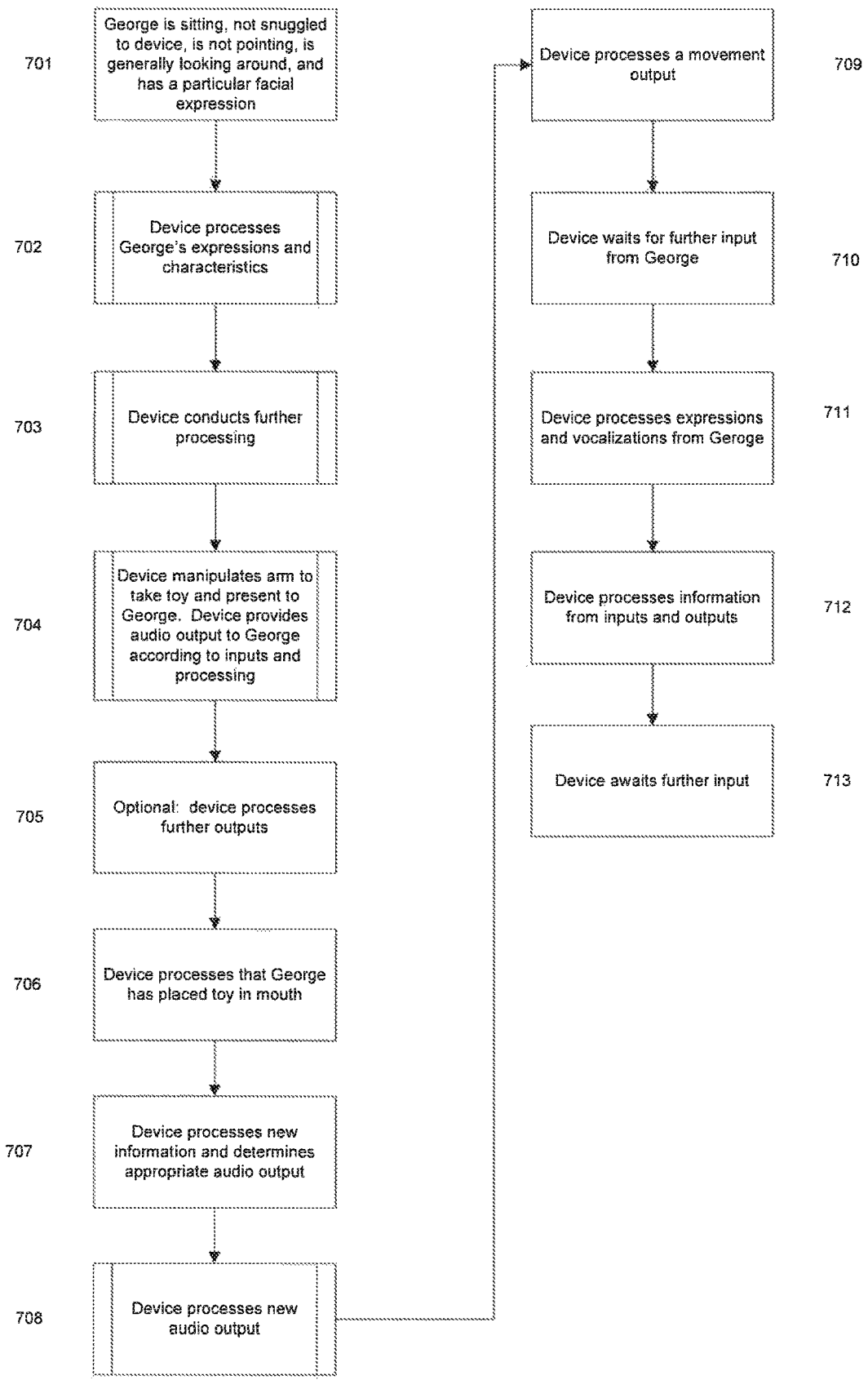
FIG. 7 is an example of operation of the present invention.

FIG. 7 sets forth the following operation of the present invention. This learning scenario involves George, an eighteen-month old, engaged in sitting but who is about to get fussy. The robot is configured to monitor George and to respond to his facial expressions to comfort and educate George. The device configured as a robot processes from prior interactions with George and his parents what different facial expressions mean for George, as an individual baby with individual signals that are specific to George. The robot also processes from input from George's parents, input from George's grandparents, past experiences with George, and best practices from early childhood experts, what works best for George and what is most comforting and productive for George, as a specific individual baby with experiences that are unique to George.

In step 701, the device configured as a robot processes that George is sitting, not snuggled up to the robot, that George's gaze is looking around generally, that George is not pointing, that George is not vocalizing, that George's facial expression has a particular quality that indicates he is about to start crying and about to get fussy, quickly. Particularly, a gaze tracking module of the device configured as a robot processes George is gazing around generally; a gesture tracking module of the device configured as a robot processes that George is not gesturing; a vocalization module of the device configured as a robot processes George is not vocalizing; a pressure sensor/touch sensor module of the device configured as a robot processes that George is not touching or in physical contact with the robot; and a facial expression module and body language module of the device configured as a robot processes that George has a look. From prior processing the device processes that George's facial features are associated with George's prior actions of being close to crying and getting fussy.

In step 702, a data collection module of the device configured as a robot processes George's expressions and other characteristics set forth in step 701, both to report to George's parents and, to provide an analysis over time of what might have caused George's discomfort for future prevention.

In step 703, the device configured as a robot processes the input from the gaze tracking module, the gesture tracking module, the vocalization tracking module, the pressure sensor/touch sensor module, the facial expression and body language modules, and the data collection module taking into account other information stored in the memory of the device, such as a prior processing of George's reactions and characteristics. The Processing Module processes, using the associated memory, that the look on George's face and his behavior at the moment means that George is about to start to cry or scream for attention. The device configured as a robot processes this from data from prior interactions with George and/or from input from George's parents themselves into the device's memory. The Processing Module also processes from its memory the following: that George is generally a fairly happy baby and therefore if the robot or a parent steps in quickly to provide entertainment, attention, education, or a combination of these things then George will not cry or scream; that without some sort of attention, entertainment, or education, George will start to scream and cry until he gets the attention and stimulation he desires; that this week, George's parents would like the robot to focus on farm animals as vocabulary words; that George is on target for an 18-month old and that teaching methods for an 18-month old will work well for George; that early childhood experts recommend a particular teaching method for 18-month olds as repetition, labeling, and gesture such as pointing or holding an object.

In step 704, the device then operates to manipulate a movable arm to take a small plastic cow out of the toy box and present it to George to educate him. In particular, the device configured as a robot provides an output by physically moving its arm and hand (by appropriate electrical, mechanical, or other means) to pick up a toy cow from the toy box, which it has identified through object recognition (or through other appropriate means such as the layout of the playroom and the location of objects from the device's memory). When George is holding the cow the robot will point to the cow and vocalize "It's the cow, George! The cow goes mooooo!" repeating for emphasis and optimal learning. In this way the device configured as a robot helps George avoid a meltdown and also teaches him new vocabulary words.

In step 705, the device configured as a robot may process an eye gaze output by moving the robot's eyes to look at the toy cow and then at George. The device may also process a facial expression output by moving the robot's facial muscles to look "ooooo" excited, perhaps with raised eyebrows and a circular "O" mouth shape typical of excited parents.

In step 706, the device configured as a robot continues to monitor George and processes that George has put the toy cow in George's mouth.

In step 707, the device configured as a robot processes this new information to determine that the appropriate vocalization audio output has changed from a commentary on the cow exclusively to a commentary on the fact that the cow is in George's mouth.

In step 708, the device configured as a robot processes the output of an audio response via an audio module of "Ooooooh George, you've got the cow in your mouth, George! It's the cow George! It's the cow! Does the cow go "mooooo" George? Yes, it does, George! The cow goes mooooooo. Does the cow go mooooooo?" The processing would also indicate that the verbal response is to be in a high-pitched, encouraging voice. The processing would also indicate that because George is 18 months old and is at the vocabulary learning point consistent with his age, that it is important at this stage of development to repeat vocabulary words and to point and gesture at the specific object being discussed and to use eye gaze directed at the object to optimize likelihood of learning new vocabulary.

In step 709, the device configured as a robot processes an output by physically moving its arm and hand (by appropriate electrical, mechanical, or other means) to point to the toy cow in George's mouth, and processes an output by physically moving its eyes (by appropriate electrical, mechanical, or other means) to look at the toy cow in George's mouth, consistent with best practices for this developmental stage of pointing and gesturing at objects to optimize vocabulary acquisition.

In step 710, the device configured as a robot processes to wait for further input from the child, and continue to monitor the child, for example by a camera to determine George's vocalized response, as well as his facial expression or body language for further processing, as well as his eye gaze and gesture.

In step 711, the device configured as a robot processes that George is now giggling and happy; a gaze tracking module of the device configured as a robot processes George is looking alternately at the cow in his mouth and at the robot; a gesture tracking module of the device configured as a robot processes that George holding and mouthing the toy cow; a pressure sensor/touch sensor module of the device configured as a robot processes George is not touching or in physical contact with the robot; and a facial expression module and body language module of the device configured as a robot processes that George is smiling broadly and happy.

In step 712, a data collection module of the device configured as a robot processes that George was made happy by the introduction of the toy cow and that George has had practice with the word "cow" and with the sound "mooooo". This vocabulary practice will, from prior programming in memory, be sent to his parents later this evening so that they can continue to play and practice with George and so that George's parents will know how his day went.

In step 713, the device configured as a robot would then wait for further input from the child, and continue to monitor the child, for example by a camera to determine George's vocalized response, as well as his facial expression or body language for further processing, as well as his eye gaze and gesture. At some point, the device configured as a robot will likely move on to a new activity such as a new toy/new vocabulary word or reading a book together, based on George's mood and input from George's parents about what they would like the device configured as a robot to focus on with George this week or even on this particular day, or based on a preset developmental plan from an early childhood expert that was selected by George's parents.

Other examples include:

Receiving audio of the child reading and comparing it to the text the child should be reading (the text on the screen or page or the text the child is looking at) and providing a response as appropriate.

Receiving audio of the child speaking and comparing it to the object the child is looking at or gesturing too and providing a response as appropriate.

Providing auditory and/or gestural response to the areas of interest to the child and/or that are part of a pre-determined lesson, and/or that are helpful to the child.

Providing auditory and/or gestural response that is leveled based on the child's ability which is determined through input through an application in one or multiple computers and/or tablets and/or mobile devices and/or robots and/or smartwatches and/or other home devices.

Providing auditory and/or gestural response that is leveled based on the child's ability as determined by machine learning based on previous interaction with the child in comparison with benchmark abilities and/or other children's abilities.

Providing auditory and/or gestural response that is leveled based on a level button or dial on one or multiple remotes and/or computers and/or tablets and/or mobile devices and/or robots and/or smartwatches and/or other home devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure uses terminology and acronyms that may not be familiar to the layperson, those skilled in the art will be familiar with the terminology and acronyms used herein.

What is claimed is:

1. A computing device comprising:
   a camera;
   a microphone;
   a speaker;
   a display device;
   a pressure sensor;
   memory accessible by at least one processor, the memory storing one or more program modules executable by the at least one processor;
   wherein the one or more program modules, when executed by the at least one processor, is capable of:
      receiving audio data from said microphone and recognizing the speech associated with a user of said computing device based on said received audio data;
      receiving video data from said camera and determining a direction of eye gaze of said user of said computing device based on said received video data;
      receiving tactile data from the pressure sensor;
      determining whether said user is touching the computing device based on the received tactile data;
      identifying an object that is disposed within the direction of said eye gaze based on the received video data from said camera using a character recognition technique or an object recognition technique;
      causing a first audio information to be transmitted from said speaker of said computing device in response to the received audio data and the received video data, wherein the first audio information comprises audio identifying the object disposed within the direction of said eye gaze in order to cause an audio response from said user of said computing device;
      determining that the audio response from said user of said computing device corresponds to the first audio information by matching at least one of a vocabulary word and a pronunciation between the audio response and the first audio information; and
      causing a celebration animation to be displayed on the display device of said computing device and a second audio information to be transmitted from said speaker of said computing device based on said determining that the audio response from said user of said computing device corresponds to the first audio information to provide positive feedback; and
      causing a third audio information to be transmitted from said speaker of said computing device based on said determining whether said user is touching the computing device.

2. The computing device of claim 1, wherein said one or more program modules, when executed by the at least one processor, is capable of receiving video data from said camera sufficient to determine the physical gestures of said user of said computing device based on said received video data.

3. The computing device of claim 2, wherein said video data comprises the facial expressions of said user of said computing device.

4. The computing device of claim 3, further comprising an output device attached to said computing device, wherein said output device is movable in response to the operation of said program modules executed by the at least one processor.

5. The computing device of claim 3, further comprising a projector device attached to said computing device, wherein said projector device projects images or data for the user in response to the operation of said program modules executed by the at least one processor.

6. The computing device of claim 2, further comprising an output device attached to said computing device, wherein said output device is movable in response to the operation of said program modules executed by the at least one processor.

7. The computing device of claim 2, further comprising a projector device attached to said computing device, wherein said projector device projects images or data for the user in response to the operation of said program modules executed by the at least one processor.

8. The computing device of claim 1, further comprising a touch pad device.

9. The computing device of claim 8, further comprising an output device attached to said computing device, wherein said output device is movable in response to the operation of said program modules executed by the at least one processor.

10. The computing device of claim 8, further comprising an output device attached to said computing device, wherein said output device is movable in response to the operation of said program modules executed by the at least one processor.

11. The computing device of claim 8, further comprising a projector device attached to said computing device, wherein said projector device projects images or data for the user in response to the operation of said program modules executed by the at least one processor.

12. The computing device of claim 1, further comprising a sensor device, wherein said sensor device operates to track the movement of said user.

13. The computing device of claim 12, further comprising a projector device attached to said computing device, wherein said projector device projects images or data for the user in response to the operation of said program modules executed by the at least one processor.

14. The computing device of claim 1, further comprising a passive RFID reader device.

15. The computing device of claim 14, further comprising an output device attached to said computing device, wherein said output device is movable in response to the operation of said program modules executed by the at least one processor.

16. The computing device of claim 14, further comprising a projector device attached to said computing device, wherein said projector device projects images or data for the user in response to the operation of said program modules executed by the at least one processor.

17. The computing device of claim 1, further comprising an output device attached to said computing device, wherein said output device is movable in response to the operation of said program modules executed by the at least one processor.

18. The computing device of claim 1, further comprising a projector device attached to said computing device, wherein said projector device projects images or data for the user in response to the operation of said program modules executed by the at least one processor.

19. The computing device of claim 1, wherein the object that is disposed within the direction of said eye gaze comprises a text.

20. A computer-implemented method for education comprising the steps of:
  receiving audio input data from a microphone connected to a computing device;
  receiving video input data from a camera connected to the computing device;
  receiving tactile data from a pressure sensor connected to the computing device;
  processing the audio input data and video input data by the computing device;
  sending, by an audio output module, audio output data from a speaker connected to the computing device;
  sending, by a video output module, video output data from a display device connected to the computing device;
  wherein the step of processing includes recognizing, by the computing device, speech associated with a user of the computing device based on the received audio input data;
  wherein the step of processing includes determining, by the computing device, a direction of eye gaze of said user of the computing device based on the received video input data;
  wherein the step of processing includes determining, by the computing device, whether said user is touching the computing device based on the received tactile data;
  wherein the step of processing includes identifying, by the computing device, an object that is disposed within the direction of said eye gaze based on the received video input data using a character recognition technique or an object recognition technique;
  wherein the speaker connected to the computing device is configured to transmit a first audio information caused by the computing device in response to the received audio input data and the received video input data,
  wherein the first audio information comprises audio identifying the object disposed within the direction of said eye gaze in order to cause an audio response from said user of said computing device;
  wherein the step of processing includes determining, by the computing device, that the audio response from said user of said computing device corresponds to the first audio information by matching at least one of a vocabulary word and a pronunciation between the audio response and the first audio information;
  wherein the display device connected to the computing device is configured to display a celebration animation caused by the computing device and the speaker connected to the computing device is configured to transmit a second audio information caused by the computing device based on said step of processing including determining, by the computing device, that the audio response from said user of said computing device corresponds to the first audio information to provide positive feedback; and
  wherein the speaker connected to the computing device is configured to transmit a third audio information caused by the computing device based on said step of processing including determining, by the computing device, whether said user is touching the computing device.

21. The method of claim 20, wherein the device is capable of receiving video data from said camera sufficient to determine the physical gestures of said user of the device based on the received video data.

22. The method of claim 21, wherein the video data comprises the facial expressions of said user of the computing device.

23. The method of claim 22, further comprising receiving information from an output device connected to the computing device, wherein said output device is movable in response to one or more of the processing steps.

24. The method of claim 22, further comprising transmitting information from a projector device connected to the computing device, wherein said projector device projects images or data for the user in response to one or more of the processing steps.

25. The method of claim 21, further comprising receiving information from an output device connected to the computing device, wherein said output device is movable in response to one or more of the processing steps.

26. The method of claim 21, further comprising transmitting information from a projector device connected to the computing device, wherein said projector device projects images or data for the user in response to one or more of the processing steps.

27. The method of claim 20, further comprising receiving information from a touch pad device connected to the computing device.

28. The method of claim 27, further comprising receiving information from an output device connected to the computing device, wherein said output device is movable in response to one or more of the processing steps.

29. The method of claim 27, further comprising transmitting information from a projector device connected to the computing device, wherein said projector device projects images or data for the user in response to one or more of the processing steps.

30. The method of claim 20, further comprising receiving information from a sensor device connected to the computing device, wherein said sensor device operates to track the movement of said user.

31. The method of claim 30, further comprising receiving information from an output device connected to the computing device, wherein said output device is movable in response to one or more of the processing steps.

32. The method of claim 30, further comprising transmitting information from a projector device connected to the computing device, wherein said projector device projects images or data for the user in response to one or more of the processing steps.

33. The method of claim 20, further comprising receiving information from a passive RFID reader device connected to the computing device.

34. The method of claim 33, further comprising receiving information from an output device connected to the computing device, wherein said output device is movable in response to one or more of the processing steps.

35. The method of claim 33, further comprising transmitting information from a projector device connected to the computing device, wherein said projector device projects images or data for the user in response to one or more of the processing steps.

36. The method of claim 20, further comprising receiving information from an output device connected to the computing device, wherein said output device is movable in response to one or more of the processing steps.

37. The method of claim 20, further comprising transmitting information from a projector device connected to the computing device, wherein said projector device projects images or data for the user in response to one or more of the processing steps.

38. The method of claim 20, wherein the object that is disposed within the direction of said eye gaze comprises a text.

* * * * *